Feb. 16, 1932.　　W. F. VAN DE VENTER　　1,845,105
MACHINE FOR MAKING WIREBOUND BOX BLANKS
Filed Aug. 17, 1929　　11 Sheets-Sheet 1

Inventor:
W. Frank Van De Venter.
By Wallace R. Lane
Atty.

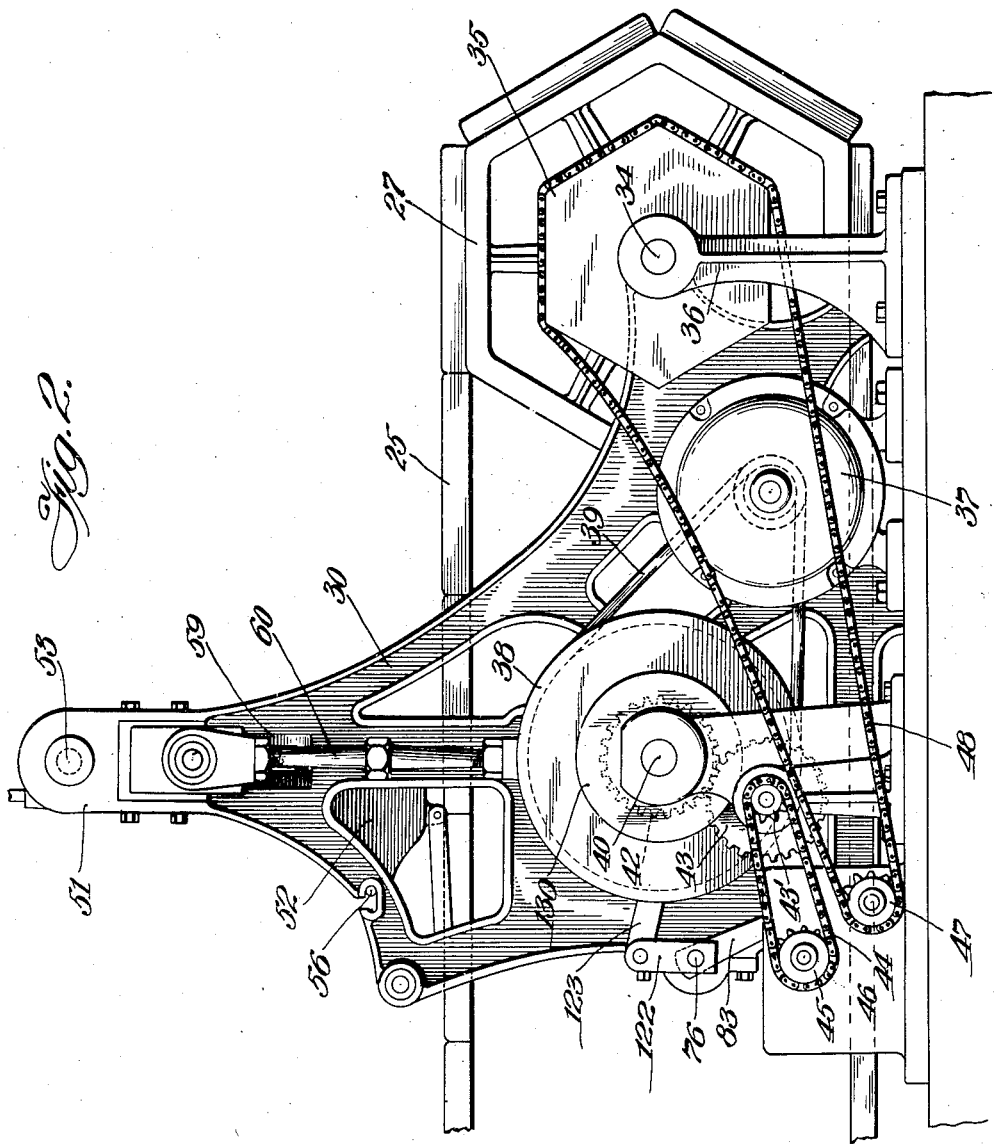

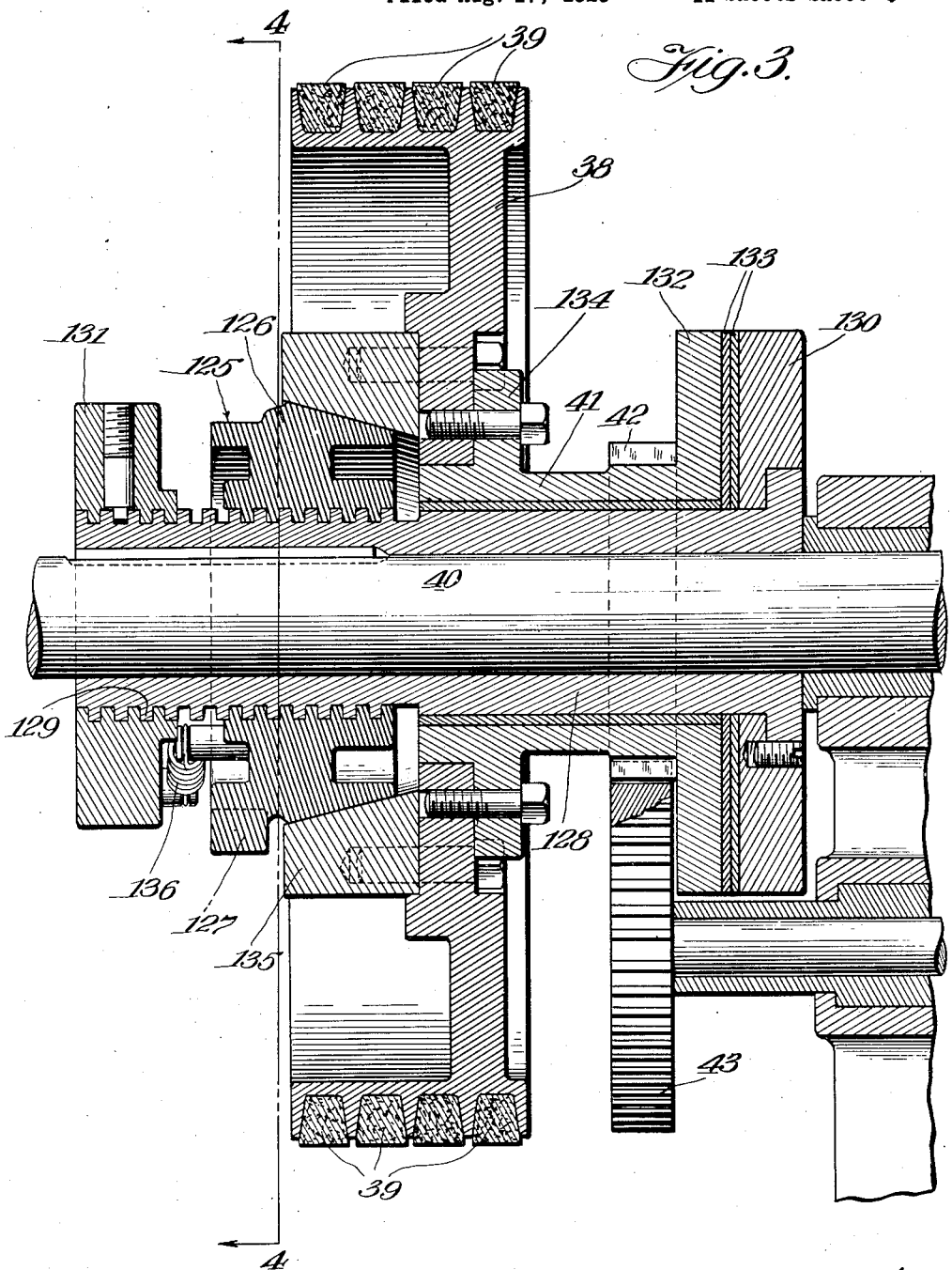

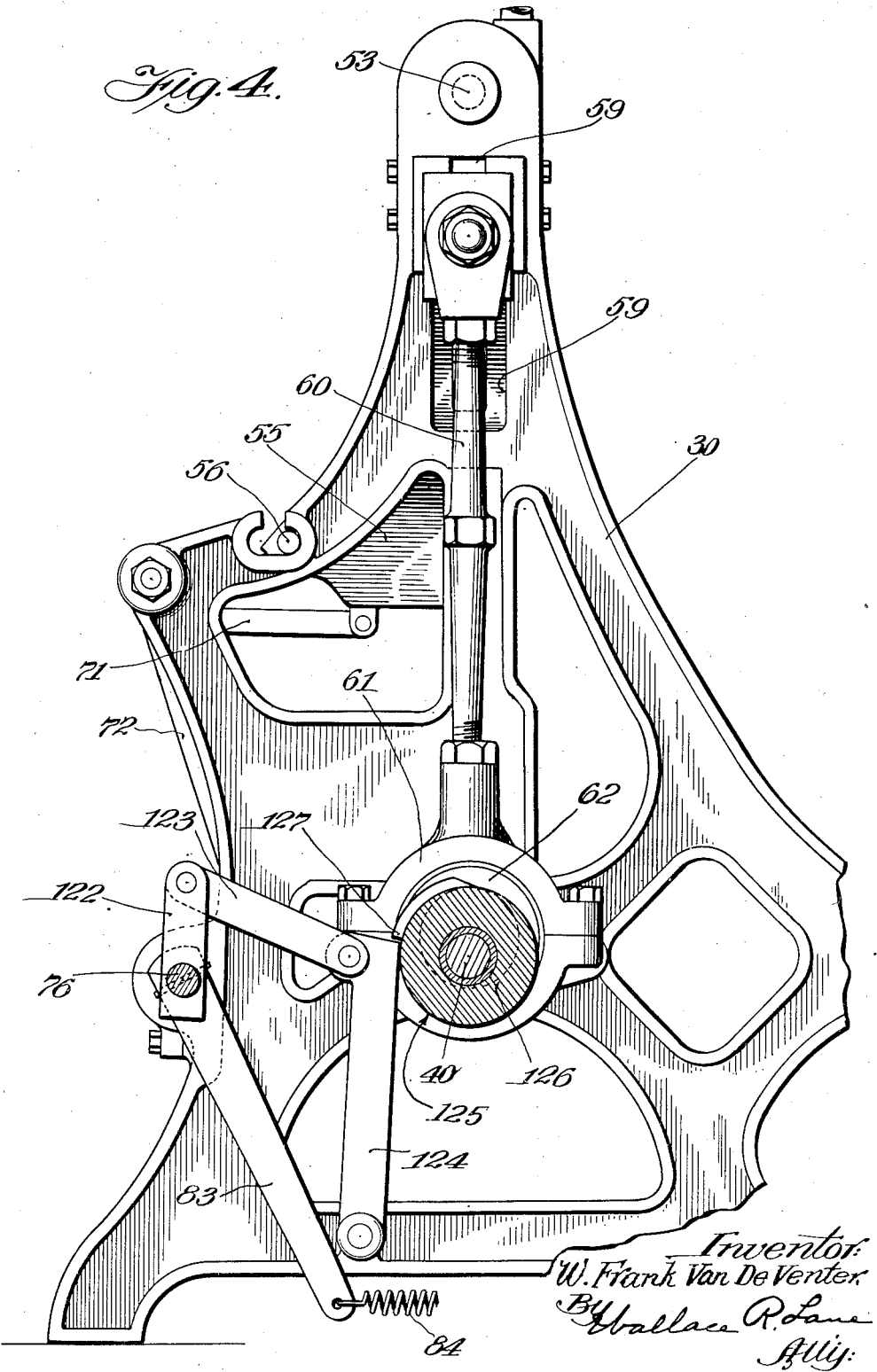

Feb. 16, 1932.    W. F. VAN DE VENTER    1,845,105
MACHINE FOR MAKING WIREBOUND BOX BLANKS
Filed Aug. 17, 1929    11 Sheets-Sheet 5
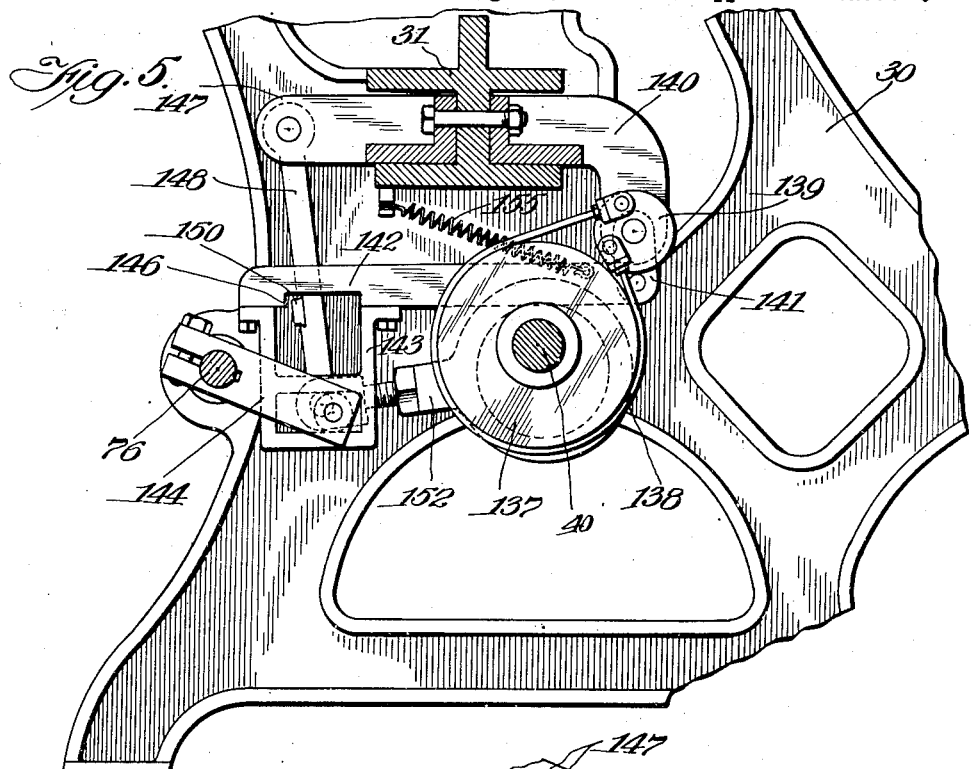
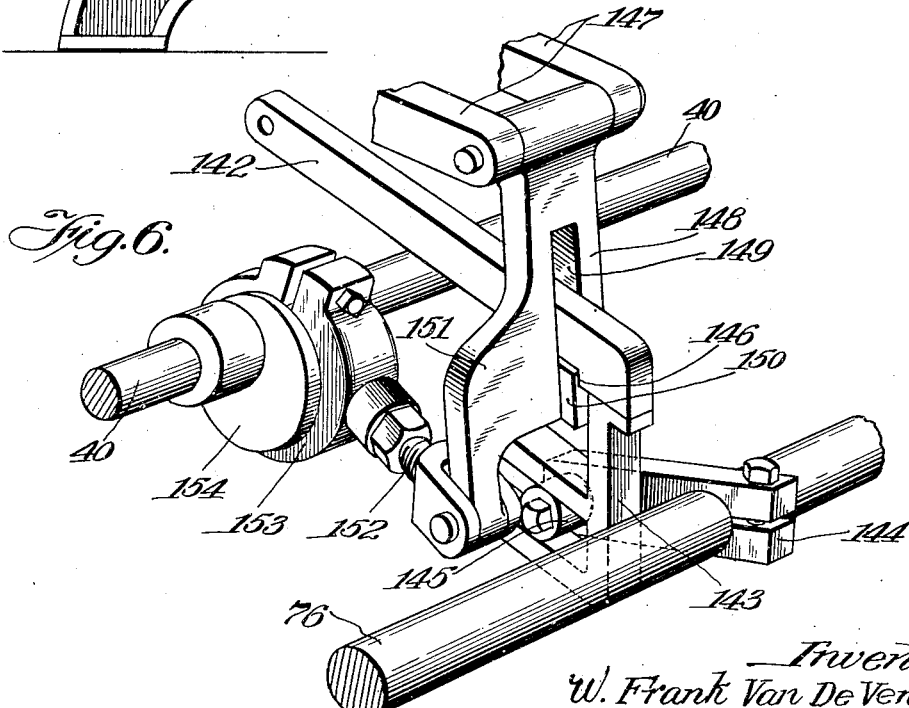

Feb. 16, 1932.  W. F. VAN DE VENTER  1,845,105
MACHINE FOR MAKING WIREBOUND BOX BLANKS
Filed Aug. 17, 1929  11 Sheets-Sheet 6

Inventor:
W. Frank Van De Venter,
By Wallace R. Lane
Atty.

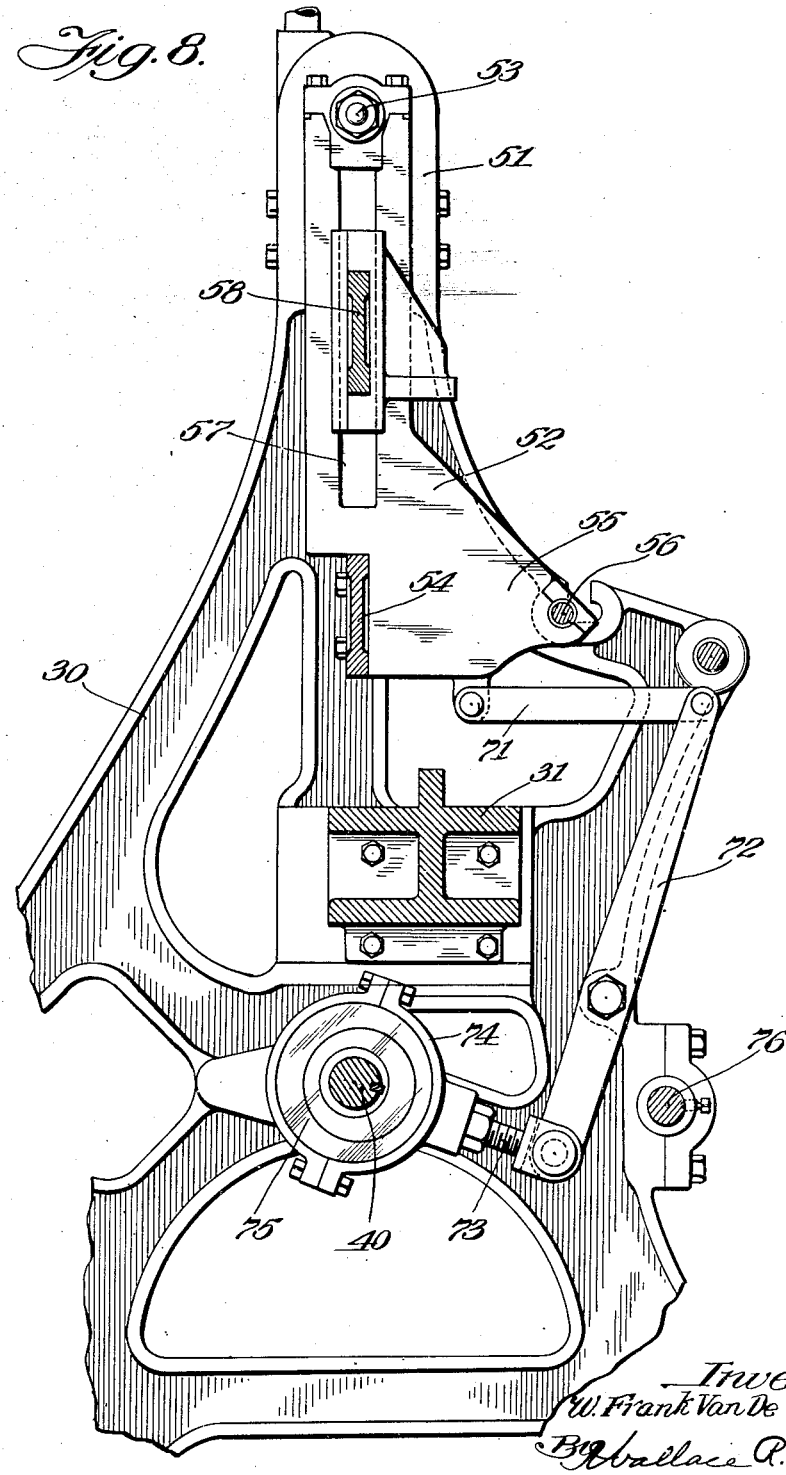

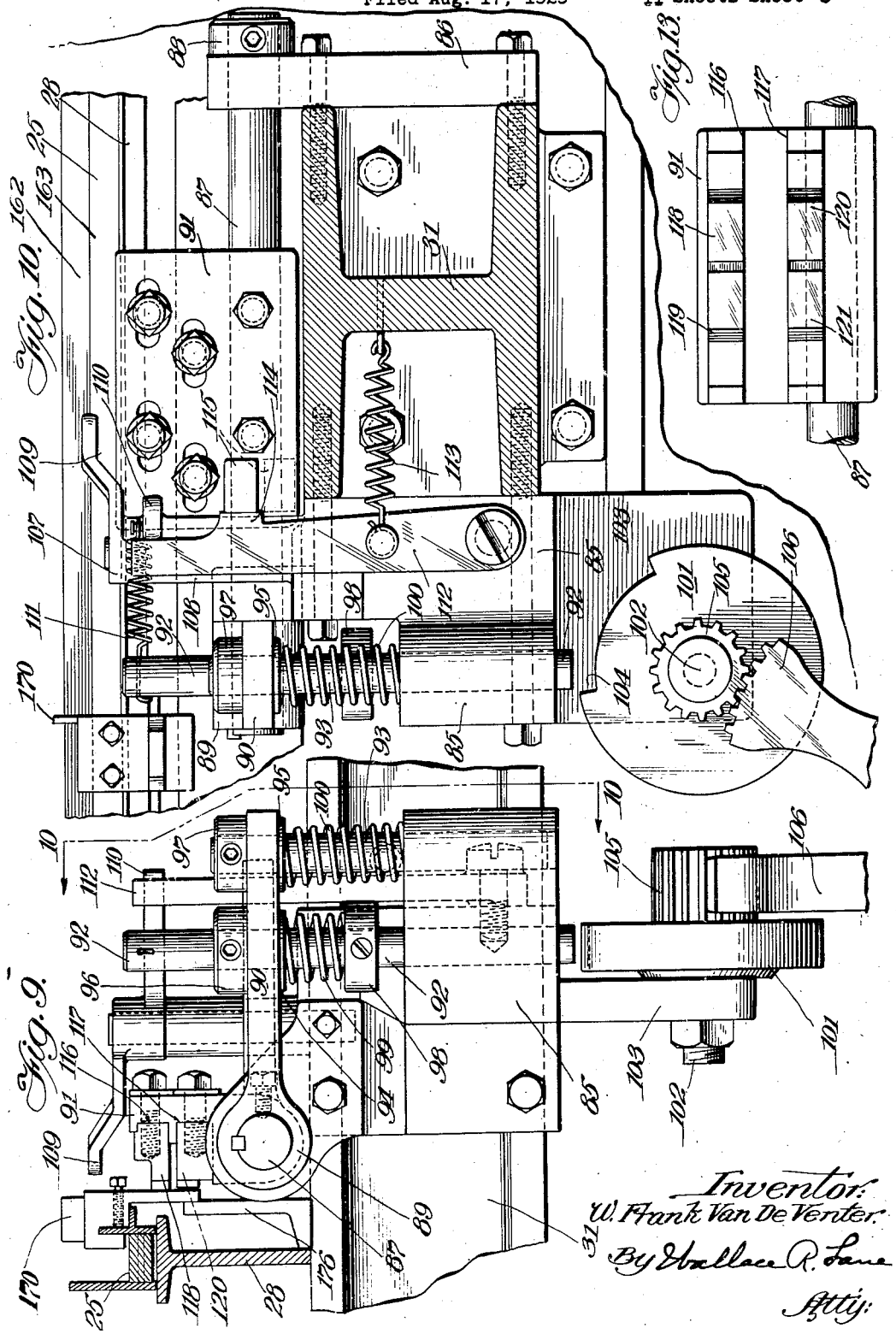

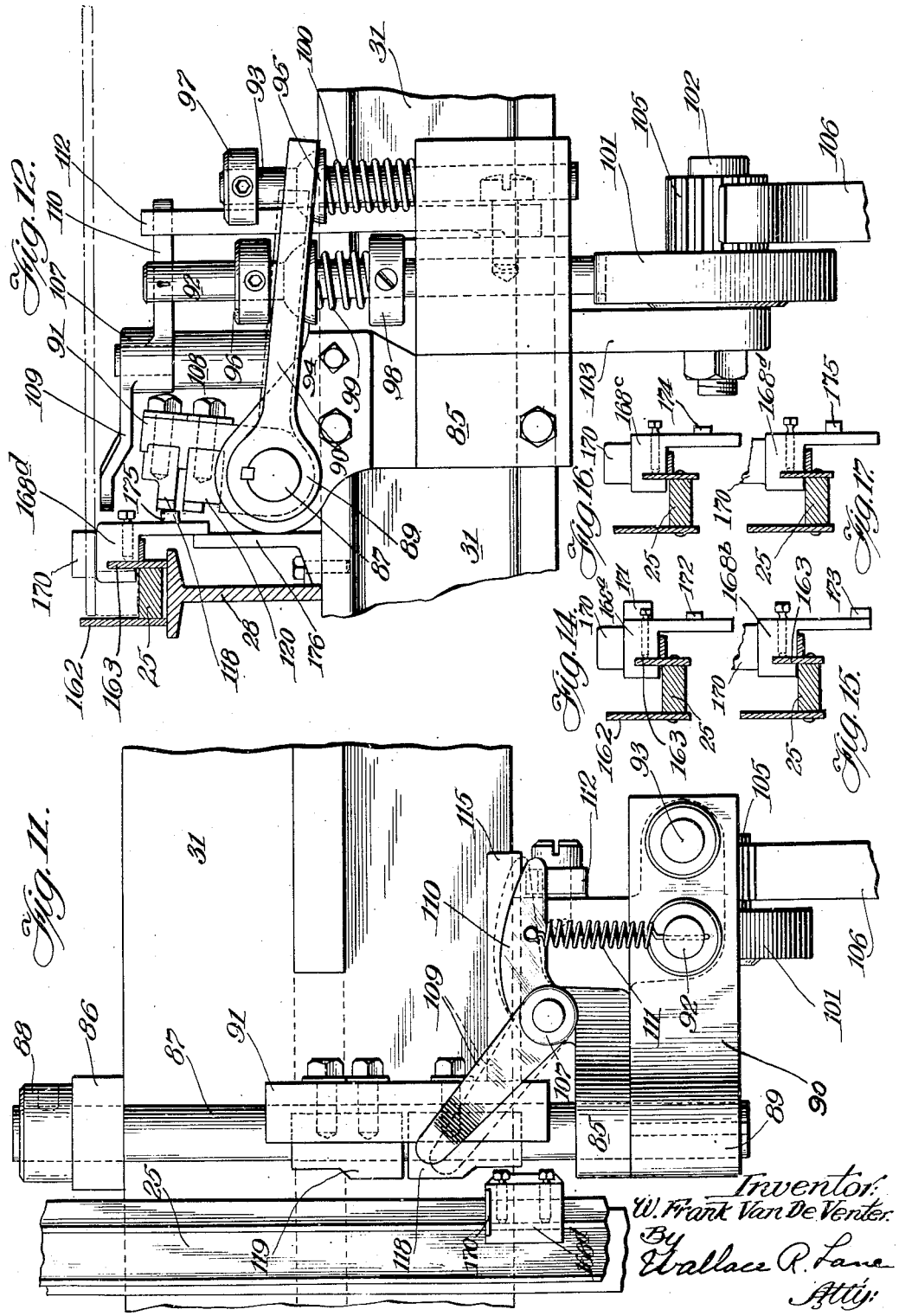

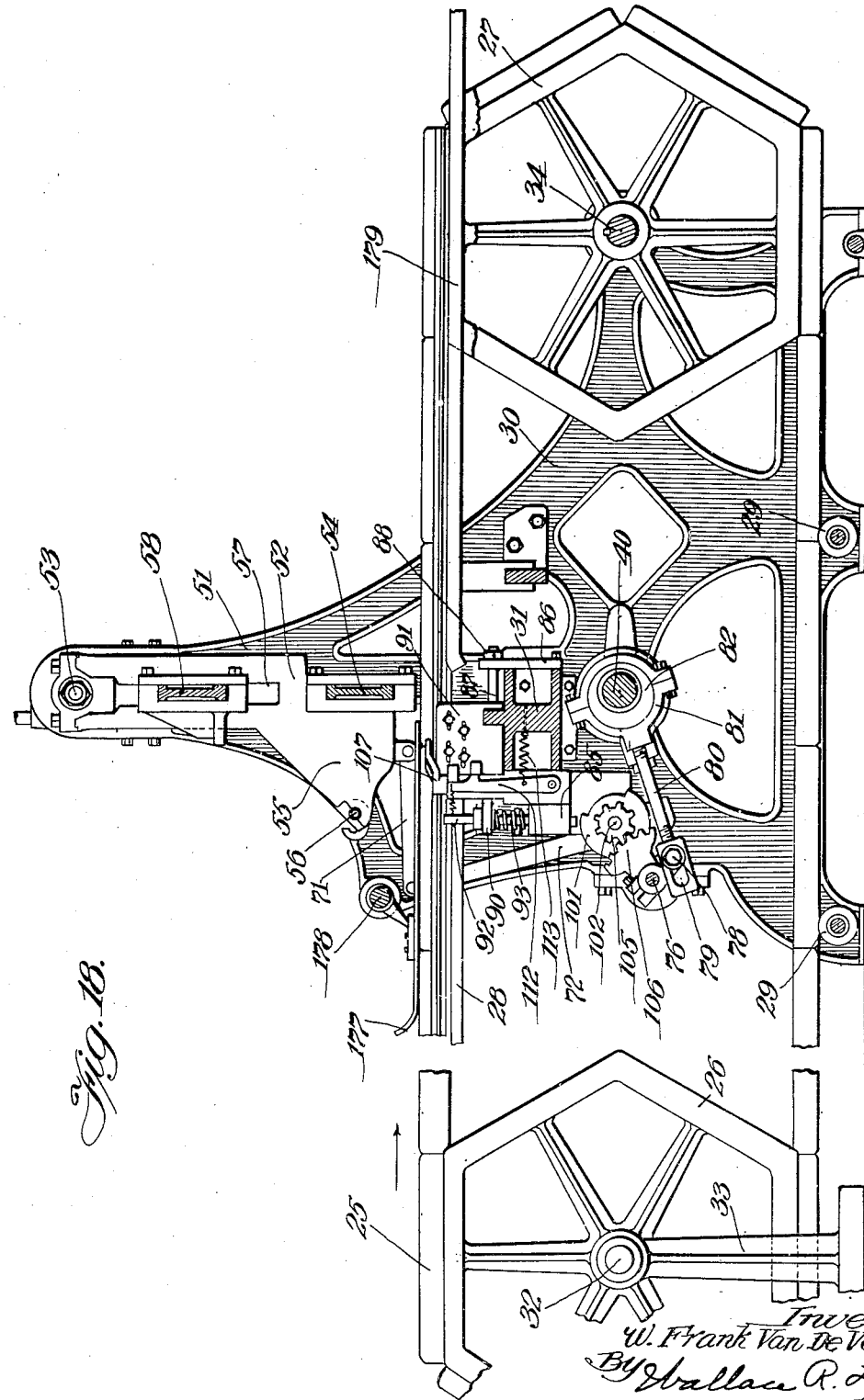

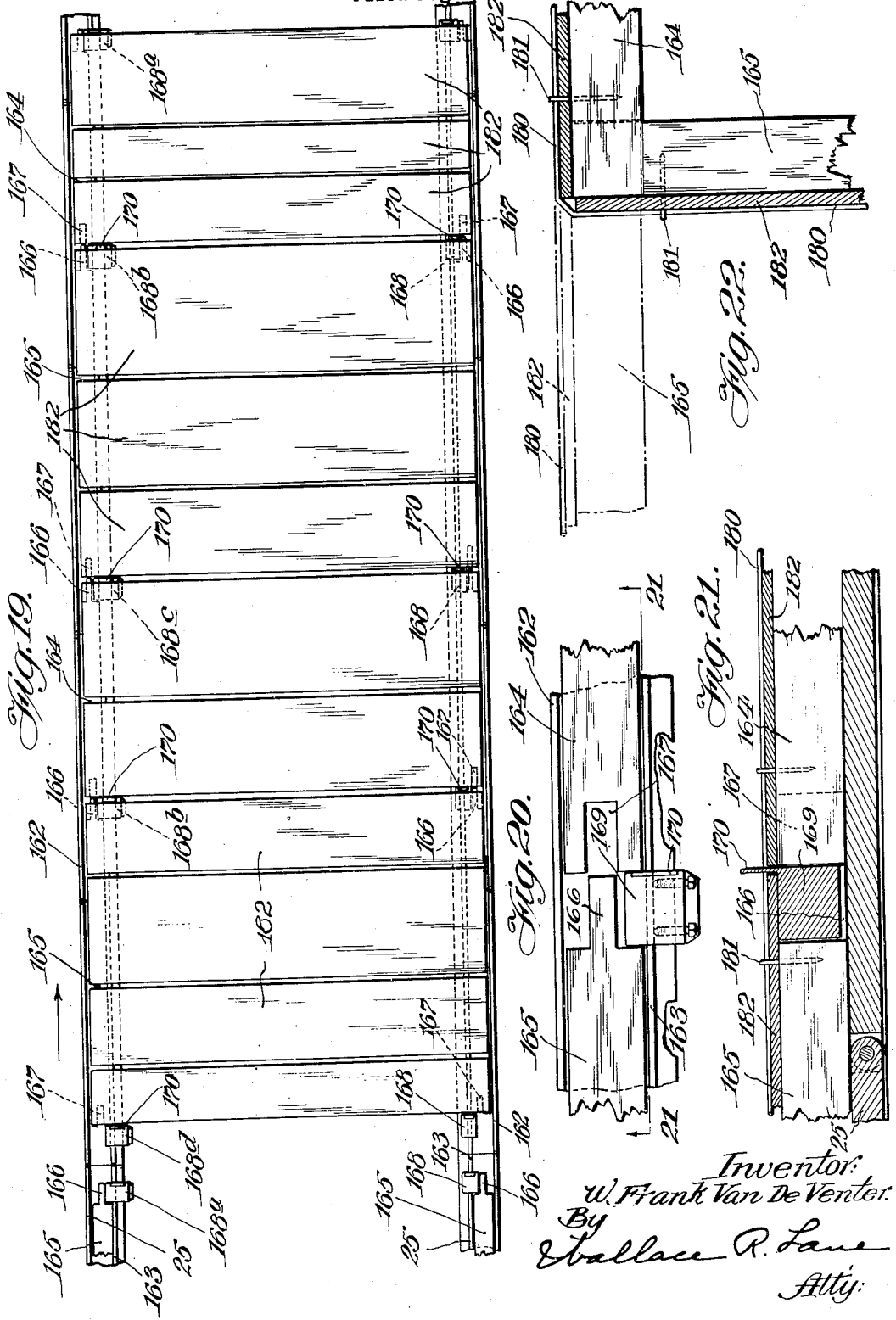

Patented Feb. 16, 1932

1,845,105

UNITED STATES PATENT OFFICE

WALTER FRANK VAN DE VENTER, OF LOUISVILLE, KENTUCKY, ASSIGNOR TO GENERAL BOX COMPANY, OF CHICAGO, ILLINOIS, A CORPORATION OF DELAWARE

MACHINE FOR MAKING WIREBOUND BOX BLANKS

Application filed August 17, 1929. Serial No. 386,608.

The invention relates to machines for making wirebound box blanks.

One of the objects of the invention is to provide a machine which is adapted to drive staples in the sides of a box blank at regular intervals depending upon the setting of the machine.

A further object of the invention is to provide a machine in which the stapling mechanism is adapted to operate continuously on a side of the box blank, being automatically arrested so as to avoid driving of staples into the lines of junction of adjacent sides.

A further object of the invention is to provide a machine in which the stapling mechanism is adjusted to be started so as to drive the first row of staples in each side at a predetermined position and thereafter drive successive rows of staples at regular intervals depending upon the initial setting of the machine and become arrested so as to avoid driving staples too near the line of junction between adjacent sides of the box blank.

A further object of the invention is to provide a machine in which the stapling mechanism is adapted to be operated continuously so as to drive successive rows of staples at uniform distance and in which means are provided in association with the work drive which starts and stops the stapling mechanism so as to avoid driving of staples too near the lines of junction between adjacent sides of the box blank.

A further object of the invention is to provide a machine in which the work is carried uniformly past stapling mechanism adapted to operate uniformly so as to drive staples with regular spacing, said stapling mechanisms being operated through a clutch which is adapted to be automatically disengaged at intervals so as to avoid driving staples too near the lines of junction between adjacent sides of a box blank.

A further object of the invention is to provide a machine in which the stapling mechanism is adapted to be disengaged at intervals and become arrested at a predetermined position.

A further object of the invention is to provide a machine in which the work is conveyed at uniform speed past stapling mechanisms operated at a uniform speed, the relative speeds of operation of the work and the stapling mechanisms being adjustable so that successive rows of staples are driven into the work at uniform spaced intervals.

A further object of the invention is to provide a machine in which the stapling mechanism and the work drive are adapted to be operated uniformly from the same source of power so as to drive successive rows of staples at regular predetermined spaced intervals, the location of the first row of staples on each box side being predetermined and the point of arrest of the stapling mechanisms so as to avoid stapling too close to the lines of junction between adjacent box sides, being also predetermined.

A further object of the invention is to provide a machine in which the work is carried forward uniformly and the stapling mechanisms are operated uniformly and control means associated with the work drive are adapted to control the clutching and declutching of a clutch so as to start and arrest the stapling mechanism at the beginning and end of the stapling of a box side.

A further object of the invention is to provide a machine in which means associated with the work drive causes the arrest of the stapling mechanism at the end of the last side of the box blank, said stapling mechanism being maintained arrested until released by further means to operate on a new blank.

A further object of the invention is to provide a machine which is adapted to drive staples with uniform spacing between successive rows and in which means are provided whereby the stapling mechanism may be caused to start and stop at the beginning and end of each box blank side, the spacing being adjustable and the means controlling the stopping and starting being adjustable so that the staples may be applied symmetrically on adjacent sides of different dimensions.

A further object of the invention is to provide a machine in which means are provided for controlling the starting and stopping of the stapling mechanism in connection with one pair of opposite box sides and separate means are provided for controlling the starting and stopping of the stapling mechanism in connection with the other pair of opposite box sides.

Other objects, advantages and capabilities will later more fully appear. My invention further resides in the combination, construction and arrangements of parts illustrated in the accompanying drawings and while I have shown herein a preferred embodiment I wish the same to be understood as illustrative only and not limiting the scope of my invention.

In the drawings,

Figure 1 is a perspective view of the machine with parts omitted and broken away, looking from the front or feeding end thereof, Fig. 2 is an elevation of the rear end of the machine as seen from the right hand side thereof, Fig. 3 is a section of the clutch and associated parts, taken on a plane transverse with respect to the machine, Fig. 4 is a sectional elevation of the right hand side of part of the machine, the section being taken on the line 4—4 of Fig. 3.

Fig. 5 is a sectional elevation of part of the machine as seen from the right, showing the brake and associated parts, the section being taken on a plane longitudinal of the machine between the side frames 30 and near the right hand frame 30.

Fig. 6 is a perspective view of mechanism associated with the brake,

Figure 7:
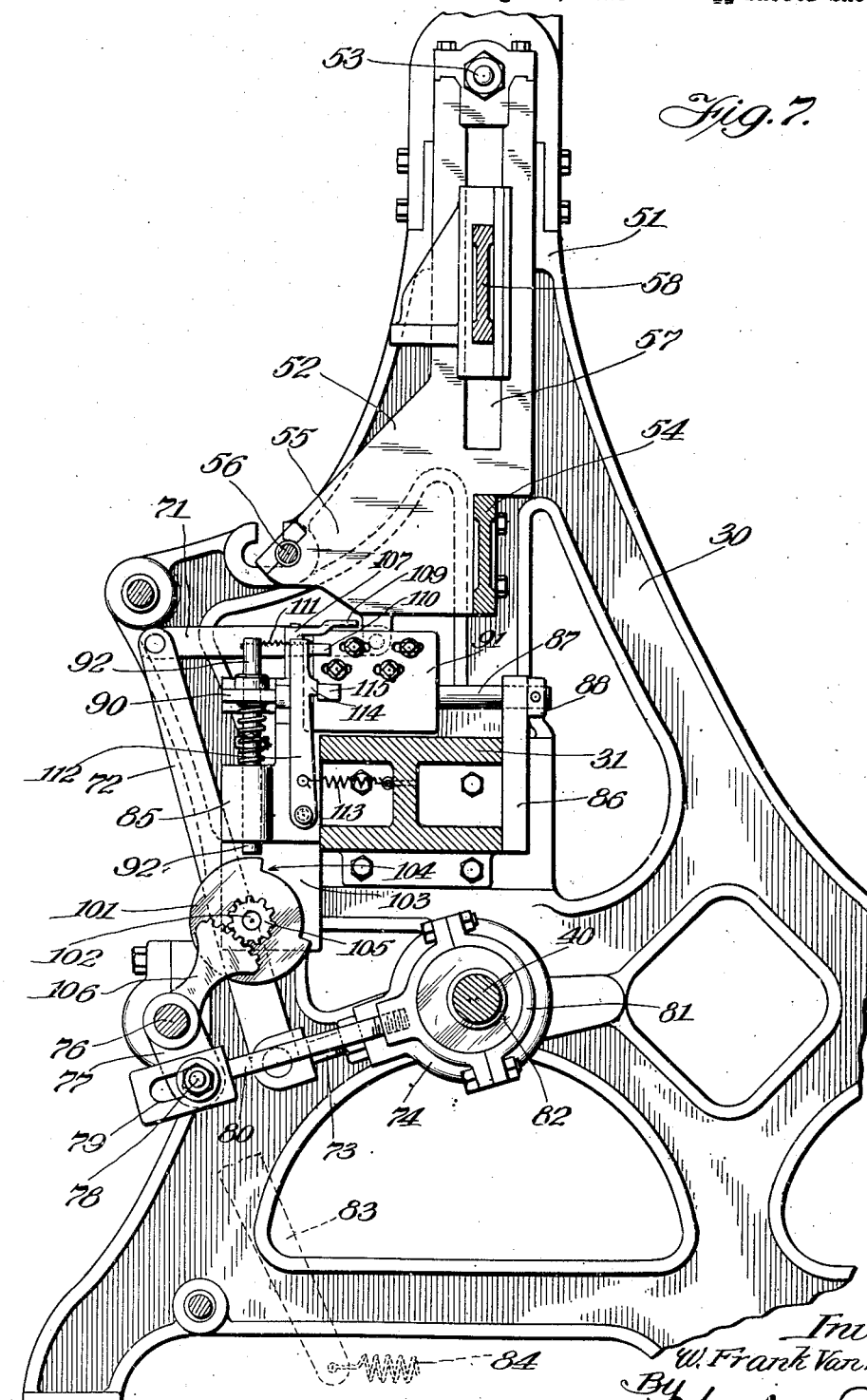

Fig. 7 is a sectional view similar to Fig. 5 taken on a plane to the left of the brake mechanism, so as to show the relation of the cam plate 91 and the means associated therewith to effect the release and arrest of the rocking shaft 76, Fig. 8 is a sectional elevation of part of the machine as viewed from the left, taken on a plane longitudinal with respect to the machine between the frames 30 and near the right hand frame 30 so as to illustrate the mechanism for oscillating the stapling mechanism, Fig. 9 is a sectional detail as viewed from the front of the machine showing the cam plate 91 and associated parts for effecting the release and arrest of the rocking shaft 76, Fig. 10 is an enlarged sectional detail in the planes represented by line 10—10 of Fig. 9 similar to Fig. 7, Fig. 11 is a plan view of the mechanism shown in Figs. 9 and 10, Fig. 12 is a sectional detail similar to Fig. 9 showing the cam plate 91 in locked position, Fig. 13 is an elevation of the face of the cam plate 91, Fig. 14 is a sectional view of the left hand chain 25 showing the spacer 168a mounted thereon, Fig. 15 is a similar view of the left hand chain 25 showing the spacer 168b mounted thereon, Fig. 16 is a similar view of the left hand chain 25 showing the spacer 168c mounted thereon, Fig. 17 is a similar view of the left hand chain 25 showing the spacer 168d mounted thereon, Fig. 18 is a view similar to Fig. 7 showing additional parts of the machine, Fig. 19 is a plan view showing the box blank assembly applied to the chains 25, Fig. 20 is a fragmentary plan view of the left hand chain 25 showing the relation of the cleats 164 and 165 to one of the spacers 168, Fig. 21 is a sectional view on the line 21—21 of Fig. 20, and Fig. 22 is a sectional detail showing adjacent box sides brought into rectangular relation in the formation of a box from the stapled box blank.

Referring to the drawings, the numeral 25 designates a pair of endless conveyors or chains which are adapted to be spaced apart at a distance depending upon the length of the boxes which are to be manufactured. Said chains 25 pass over hexagonal sprocket-wheels 26 and 27, mounted at the front and rear ends of the machine, respectively. The chains 25 are preferably constituted by members corresponding in length to the sides of the wheels 26 and 27, said members being suitably hinged together.

The upper lengths of the chains 25, between the wheels 26 and 27, are slidably supported upon rails 28 which extend longitudinally through the machine and are supported upon the main framework thereof, while the lower lengths of chains, between the wheels 26 and 27 are supported upon rolls or supporting wheels 29, also mounted upon the main frame of the machine.

The main frame of the machine consists essentially of two vertical castings 30 located to the outside of the chains 25 and at an interediate point between the wheels 26 and 27, and a horizontal transverse body member 31 which is rigidly bolted to the side castings 30. The body member 31 is located below the level of the upper lengths of the chains 25.

Figure 1:
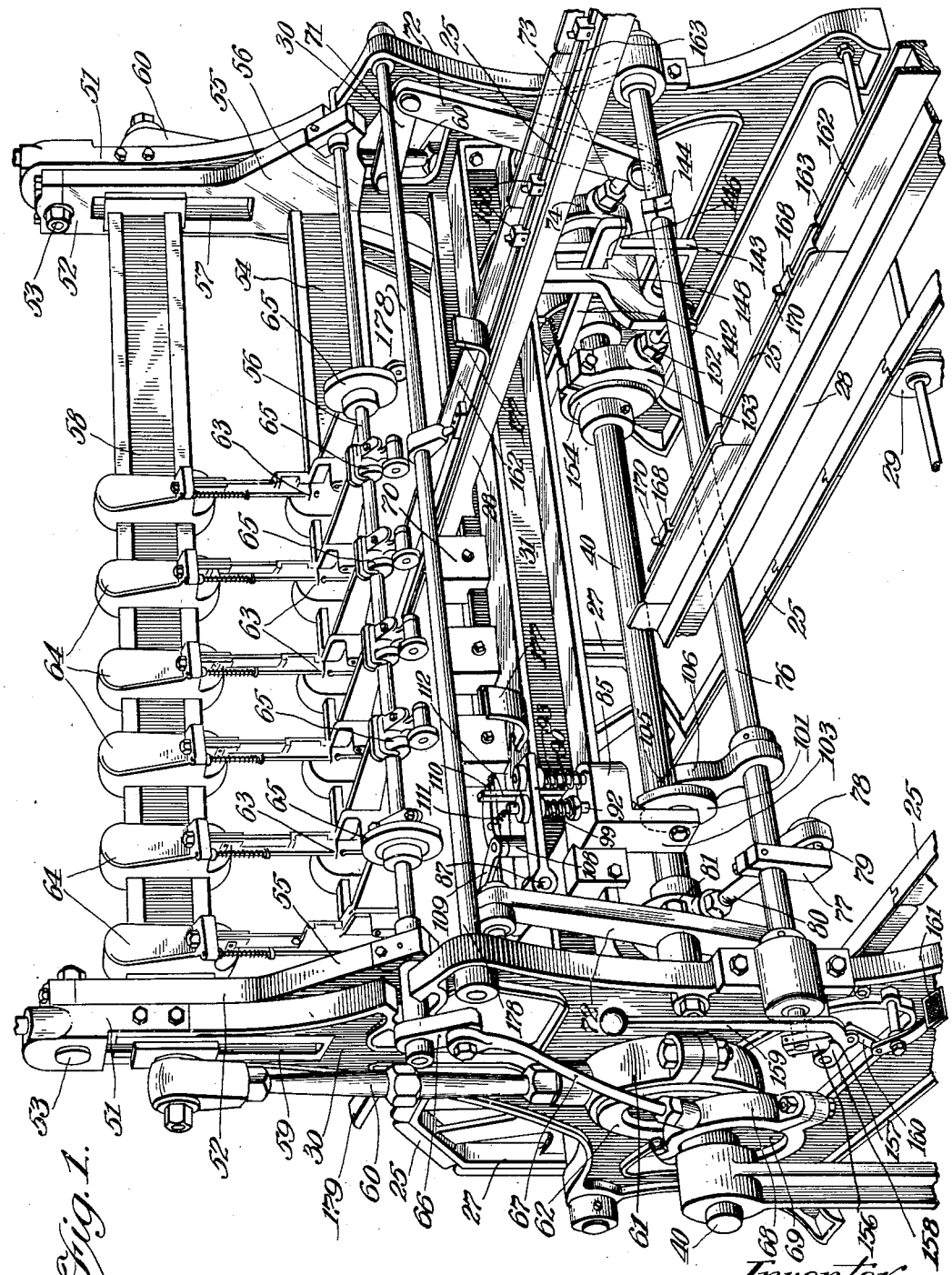

One of the chains 25, that is the one on the left as seen in Fig. 1 together with the sprocket wheels 26 and 27, rail 28 and supporting wheels 29 is intended to occupy a fixed position close to the side of the frame, while the other chain 25 and associated parts are adapted to be located in varying positions parallel thereto, for the purpose of accommodating the machine for use in the manufacture of boxes of different lengths.

The front sprocket wheels 26 are mounted upon an axle 32 rotatably mounted in standards 33. The rear sprocket wheels 27 are mounted upon an axle 34 and are keyed or splined thereto so as to rotate therewith. The axle 34 is rotatably mounted in the castings 30 and projects beyond the right hand casting 30 and is provided with a sprocket wheel 35, whereby it is caused to rotate. Said sprocket wheel is preferably hexagonal in shape. The outer end of the axle 34 is rotatably supported in a standard 36, located beyond the sprocket wheel 35.

The machine is operated by a motor 37, which drives a pulley 38 by means of a suitable belt 39. The pulley 38 is mounted upon the main shaft 40, which extends transversely of the machine and projects on either side beyond the castings 30. As will be more particularly described hereinafter, a clutch is provided whereby the pulley 38 may be caused to actuate the main shaft 40.

The pulley 38 is provided with a lateral sleeve 41 which carries a spur gear 42, which is connected by means of spur gears 43, 43′, chain 44 and spur gear 45 to a suitable gear box 46. Said gear box 46 carries a spur wheel 47, which is provided with a chain 48 which passes over the sprocket wheel 35 to operate the chains 25. The gear box 46 may be of any suitable type, provided it is capable of giving a large number of different speed ratios between the gears 45 and 47 which differ by progressive small increments, for the purpose hereinafter to be described.

The castings 30 are provided with upward extensions 51 in which two cheeks 52 are pivotally mounted at 53. Said cheeks are connected by a lower crosshead 54 so that they move about their pivots as a unit. The cheeks 52 are provided with forwardly projecting portions 55 which carry a rotatable shaft 56. The upper ends of the cheeks 52 are provided with vertical slots 57 which receive and guide an upper crosshead 58. The crosshead 58 has portions which project through slots 59 in the castings 30 and are engaged by pitmen 60. Said pitmen are provided at their lower ends with eccentric straps 61 engaging eccentrics 62 similarly mounted on the main shaft 40 on the exterior sides of the castings 30.

The stapling or stitching mechanism may be of any suitable type. For example it may suitably comprise portions 63 mounted upon the crosshead 54, and portions 64 mounted upon the reciprocating crosshead 58. The relative reciprocation of the crossheads 58 and 54 operate the staple forming and driving mechanism in known manner. The wire from which the staples are formed is fed to the stapling devices 63—64 by friction wheels 65, which are mounted upon the shaft 56. The shaft 56 is given step-by-step rotation by means of a lever 66 movably mounted thereon and connected thereto by means of a pawl and ratchet mechanism (not shown). The lever 66 is oscillated to effect the step-by-step feed, by means of a pitman 67, provided at its lower end with an eccentric strap 68, which rides upon an eccentric 69. The eccentric 69 is mounted on the main shaft 40 on the outer side of one of the eccentrics 62 and is appropriately positioned so that the feed of the staple wire is properly timed with respect to the staple forming and driving operations.

The number of stapling devices may be adjusted as desired. For example, as shown in the drawings, six stapling devices are used and the two extreme devices are intended to drive staples through the veneer into the cleats which are carried by the chains 25. The intermediate stapling devices are intended to staple or stitch binding wires directly to the veneer and suitable anvils 70 are provided for the purpose of supporting the work and clenching or bending the points of the staples which pass through the veneer.

As indicated above the chains 25 are intended to work continuously. In order to prevent dragging during the driving of the staples, the cheeks 52, together with the crossheads 54 and 58 and the stapling devices and associated parts carried thereby are given an oscillating movement about the pivotal center 53, which movement, during the driving of the staple is in the same direction as the movement of the chains 25 and is substantially equal to said movement. This oscillating movement is effected by links 71 which connect the cheeks 52 to the upper ends of levers 72, which are pivotally mounted on the castings 30. The lower ends of the levers 72 are connected by pitmen 73 to eccentric straps 74, mounted upon eccentrics 75 on the main shaft 40. As will be readily understood, the eccentrics 75 are positioned on said shaft 40 in relation to the position of the eccentrics 62, so that the rearward movement of the stapling devices 63, 64, is synchronized with the staple driving operation.

A rocking shaft 76 is mounted in the main frame in parallel relation and somewhat in front of the main shaft 40. The rocking shaft 76 carries an arm 77, which carries a laterally projecting pin 78. Said pin 78 engages in a slot 79 provided in one end of a pitman 80. The other end of the pitman 80 carries an eccentric strap 81 which rides on an eccentric 82 mounted on the main shaft 40.

Also mounted on the rocking arm 76 is a lever 83, which is connected to a tension spring 84, which tends to hold the pin 78 at the inner end of the slot 79.

Mechanism is provided adjacent one of the chains 25, the left hand chain as seen in Fig. 1, for the purpose of automatically arresting the rocking motion of the shaft 76. This mechanism comprises castings 85 and 86 bolted to the front and rear sides of the body member 31. Said castings form the bearings of a shaft 87 which lies parallel and close to the chain 25. A collar 88 mounted at the rear end of the shaft 87 by means of a set screw, and the boss 89 of a latch 90 keyed to the forward end of said shaft, prevent longitudinal movement thereof. Between the castings 85 and 86 is mounted, by means of set screws, a cam plate 91, which occupies a substantially vertical position.

The latch or lever 90 is perforated to receive the vertical rods 92 and 93, and is suitably recessed on its under side to engage the upper spherical surfaces of collars 94 and 95 slidably mounted on said rods 92 and 93. At their upper ends the rods 92 and 93 are provided with collars 96 and 97 which are held rigidly thereto by set screws or the like. The rod 92 is slidably mounted in the casting 85, and the rod 93 is rigidly mounted therein. Between the lever or latch 90 and the casting 85, the vertical rod 92 is provided with a collar 98, fixedly mounted on said rod by means of a set screw, and a helical spring 99 is located between the latch 90 and the collar 98. Sufficient clearance is left between the collar 98 and the casting 85 to provide for the vertical movement of the rod 92 hereinafter to be described.

Between the latch 90 and the casting 85 the vertical rod 93 is provided with a helical spring 100. This spring bearing upon the collar 95 tends to hold the latch 90 in its uppermost position, which position is controlled by the location of the collar 97.

When the latch 90 is in its uppermost position, as shown in Fig. 9, the rod 92 extends through the casting 85 so that its lower end is adjacent to the periphery of a small wheel 101 mounted upon a stub-axle 102 carried in a downward projection 103 of the casting 85. The wheel 101 is recessed at 104 and is provided with an integral spur wheel 105, which cooperates with a toothed segment 106 mounted upon the rocking shaft 76.

A bell crank lever 107 is mounted on a vertical axis constituted by an upstanding portion 108 of the casting 85. The bell crank lever 107 is provided with an arm 109 which extends over the top of the cam plate 91 and is adapted to cooperate with projections or members carried by the chain 25 as will be more fully described hereinafter. The bell crank lever 107 also comprises an arm 110 which is directed substantially transversely of the machine adjacent the front edge of the cam plate 91. The arm 110 is normally held in its forward position by means of a spring 111 which is attached thereto and to the upper end of the vertical rod 92 or other suitable point of the machine. This arm abuts upon the rear edge of a vertical lever 112 which is pivoted at its lower end to the casting 85 and is connected by a spring 113 to the body member 31 so that it tends to move rearwardly and forms an abutment for the lever arm 110.

The rear face of the vertical lever 112 is provided with a latch member or projection 114 which normally bears against a horizontal finger 115 carried by the cam plate 91. The vertical lever 112 is recessed below the latch projection 114 so that when the cam plate 91 is moved inwardly about its axis, the finger 115 becomes disengaged from the latch projection 114 and the lever 112 moves rearwardly under the action of the spring 113 so that the cam plate 91 is maintained in its state of displacement until the latch projection 114 is again released. When the lever 112 moves rearwardly into interlocking engagement with the finger 115 the bell crank lever 107 is rotated about its axis and its arm 109 is moved laterally toward the chain 25. As will be more fully described projections are provided on the chain which are adapted to contact with said arm, thereby causing the release of the lever 112. It will be understood that the inward movement of the cam plate 91 causes downward movement of the latch 90 resulting in downward pressure being applied upon the rod 92 through collar 94, spring 99 and collar 98. This pressure causes the lower end of the rod 92 to enter the recess 104 of the wheel 101 when said recess becomes presented thereto. As will be more fully described this engagement between the rod 92 and the recess 104 takes place when the displacement of the cam plate 91 is sufficient to result in the interlocking engagement between the finger 115 and the latch lever 112 and also with lesser displacement of the cam plate 91.

The face of the cam plate 91, which is presented toward the chain 25 is provided with an upper horizontal recess 116 and a lower horizontal recess 117 which are adapted to receive cam members of various shapes whereby the operation of the machine may be adjusted to boxes of different dimensions.

As shown more clearly in Fig. 13 a forward cam member 118 and a rear cam member 119 may be located in the recess 116, while a forward cam member 120 and a rear cam member 121 may be located in the recess 117. Said cam members may suitably be secured to the cam plate 91 by means of bolts which extend through slots in the cam plate 91. As shown in Fig. 13 the cam members 118 and 119 and 120 and 121 are placed adjacent each other so as to act as a single cam member.

Opposite the inner edge of the pulley 38, the rocking shaft 76 is provided with a lever 122 adapted to rock with said shaft. The lever 122 is connected by a link 123 to the upper end of a buffer or pivoted lever 124 so that the upper corner thereof is adapted to operate inwardly and outwardly adjacent the surface 125 of a nut 126 which forms part of the clutch mechanism which will be more particularly described hereinafter. The surface 125 is provided with a projection 127 which is adapted to contact with the buffer 124 when it is held in its inward position. As will be hereinafter explained, in the normal operation of the machine, that is while the stapling is in operation, the buffer 124 is withdrawn from the path of the projection 127. When, however, the rocking shaft 76 becomes locked the projection 127 comes into contact with the buffer 124 so that the clutch is released.

The clutch comprises a sleeve 128 keyed to the main shaft 40 having rigidly attached to the outer end thereof a friction disc 130 and at the inner end a disc 131. Said sleeve 128 is exteriorly threaded as shown at 129 and the nut 126 is mounted on said threaded portion. The sleeve 41 is rotatably mounted upon the sleeve 128.

The sleeve 41 carries the spur wheel 42 and a friction disc 132, which cooperates with friction disc 130, suitable friction plates 133 being interposed therebetween. The sleeve 41 carries a flange 134 to which the pulley 38 is bolted. The nut 126 is frusto-conical in shape and its conical surface is adapted to engage the corresponding surface of an annular member 135 carried by the pulley 38. A tension spring 136 is provided between abutments provided on the disc 131 and the nut 126. This spring tends to cause the nut 126 to rotate in the normal direction of rotation of the shaft 40, that is the counter-clockwise direction as viewed in Fig. 4, so that it tends to cause the nut to feed toward the pulley 38 and the friction discs 130 and 132, so that the pulley 38 is clutched to the shaft 40 automatically, provided the projection 127 of the nut 126 is not held by the buffer 124.

Means are provided for automatically arresting rotation of the main shaft 40 at a position corresponding to the uppermost position of the crosshead 58, when the clutch is disengaged by the arresting of the rocking shaft 76. This mechanism is best shown in Figs. 5 and 6. It is located between the side castings 30 and comprises a brake drum 137 mounted upon the main shaft 40. Said brake drum is encircled by a brake band 138, the ends of which are mounted on pins carried by a disc 139, said pins being located on the forward part of said disc as shown in Fig. 5. The brake disc 139 is rotatably mounted upon a bracket 140 carried by the body member 31. Rigidly connected to the brake disc 139 is a short arm 141 which is directed downwardly and is connected to a horizontal lever 142. The lever 142 is provided with a depending slotted stirrup member 143 which is located in proximity of the rocking shaft 76.

The rocking shaft 76 is provided with a lever or arm 144, which carries at its free end a pin provided with a roller 145. The roller 145 is engaged in the slot of the stirrup member 143, so that as the shaft 76 rocks, the stirrup member 143 and the horizontal lever 142 are moved upwardly and downwardly continuously. The horizontal lever 142 is recessed so as to provide a projection 146 on the horizontal lever 142, said projection being adapted to cooperate with other mechanism which will now be described.

The body member 31 carries a bracket 147 which is provided with bifurcated members which extend forwardly of the machine and pivotally carry between them the upper end of a link 148. Said link is slotted at 149, which slot receives the horizontal lever 142. The lower end of the slot 149 is closed by a projection 150 which is adapted to cooperate with the projection 146 on the horizontal lever 142. The link 148 carries a lateral wing 151 which is pivotally connected to a pitman 152 provided with an eccentric strap 153 which cooperates with an eccentric 154 mounted upon the main shaft 40. It will thus be understood that the projection 150 during the normal stapling operation of the machine, is given a substantially horiontal reciprocation, while the projection 146 is given a substantially vertical reciprocation. The paths of the projections 146 and 150 intersect but their movements are so adjusted that said projections do not come into contact unless the rocking shaft 76 is held against rocking with the projection 146 in its lowermost position. A tension spring 155 tends to hold the lever 142 in a relatively advanced position, said spring being of insufficient strength to exert an appreciable tightening of the brake band 138.

As will be more particularly described hereinafter when the rocking shaft 76 is held against rocking, the projection 146 remains in the path of the projection 150, so that the latter towards the end of its forward stroke collides with the projection 146 and forces the lever 142 forwardly, thereby rotating the disc 139 in clockwise direction as viewed in Fig. 5, thus tightening the brake band 138 so that the shaft 40 is brought to a stop. The eccentric 154 is mounted upon the shaft 40 with respect to the eccentrics 62 so that the brake is applied when the crosshead 58 has reached its uppermost position.

The rocking shaft 76 extends beyond the left hand casting 30, and is provided with an arm 156, the outer end of which is provided with a projection 157, which is adapted to cooperate with a projection 158 on a hand lever 159 pivoted adjacent the rocking shaft 76. The hand lever 159 is connected by a link 160 to a pedal lever 161 which is also mounted on the casting 30. When during the operation of the machine, the hand lever 159 is raised by hand or by the pedal lever 161, part of the upper surface of said hand lever is brought into contact with the arm 156, which slides thereover until the projections 157 and 158 are brought into cooperative contact. This position of the rocking arm 76 corresponds to the extreme position of its movement in which it is held when the rod 92 is located in the recess 104 of the wheel 101. It will thus be understood by operation of the hand lever 159 or the pedal lever 161, the rocking shaft 76 may be held in such a position that the clutch is disengaged and the stapling mechanism arrested with the crosshead 58 at its uppermost position, while the chains 25 continue to move. When the hand lever 159 is moved downwardly, the clutch engages and the operation of the stapling mechanism is resumed.

As indicated above the chains 25 are constituted by lengths or links pivoted together. Said links are preferably of the same length as the sides of the wheels 26 and 27. The peripheries of the wheels 26 and 27 are channeled circumferentially so as to keep the chains in proper position. Each link of the chains 25 is provided with an upstanding exterior flange 162, and at its inner edge with a somewhat shorter upstanding flange 163. The distance between the flanges 162 and 163 is sufficient for the reception of cleats 164 and 165 which are to form part of the box blank. Each of the cleats 164 and 165 is cut away at one end to form a tongue 166, while a slot 167 is cut in the other end, said slot being adapted to receive a tongue 166. The cleats are placed upon the chains with the tongues 166 pointing in one direction, for example rearwardly as illustrated in Fig. 19. The tongues 166 and slots 167 are located vertically and the outer face of the tongue 166 is located substantially in the plane of the slotted end of the adjacent cleat. For the purpose of insuring proper placing of the cleats 164 and 165 on the chains 25, spacers or abutment members 168 are provided, said spacers being removably attached to the inner flanges 163 by set screws or the like. Said spacers 168 comprise body portions 169 which are substantially equal in length to the tongues 166. Said portions 169 are located, with the cleats 164 and 165 between the flanges 162 and 163 and lie alongside the inner side of the tongues 166, forming an abutment for the slotted ends of said cleats and for the cutaway shoulders of said cleats, as more clearly seen in Fig. 20. At their forward edges the spacers 168 are provided with upstanding ribs or pieces of thin metal 170, which are located transversely with respect to the chains 25 and extend upwardly above the upper level of the cleats 164 and 165 and the inner flanges 163, and preferably also above the outer flanges 162.

As clearly shown in Fig. 19 the spacers 168 are located so as to produce a box blank having four sides of which the opposite sides are equal in length. Thus the first and third sides are shown as having relatively short cleats 164, while the second and fourth sides have relatively long cleats 165. Other proportions may be used as desired.

The spacers 168 on the left hand chain 25 are provided with lugs or projections on their inner sides, which lugs are intended to cooperate with the lever arm 109 and the cam members 118, 119, 120 and 121. The lugs or projections referred to are located at different levels and according to the relation of the spacer to the box blank. Accordingly the left hand spacers 168 are designated 168$^a$, 168$^b$, 168$^c$ and 168$^d$ on Fig. 19. The spacer 168$^a$ is shown in greater detail in Fig. 14. Said spacer is provided with an inwardly directed lug 171 which is adapted to contact with the lever arm 109 for the purpose of releasing the rod 92 from the recess 104 of the wheel 101, thereby releasing the rocking shaft 76 and allowing the stapling mechanism to resume operation when the lug 172 passes out of contact with the cam members 118 and 119.

The spacer 168$^b$, which is positioned at the foremost part of the second and fourth sides of the box blank is illustrated more fully in Fig. 15. This spacer is provided with a lug 173, which is adapted to cooperate with the lower cam members 120 and 121.

The spacer 168$^c$ is more clearly illustrated in Fig. 16. This spacer is provided with a lug 174 which is similar to lug 172 on the spacer 168$^a$, but this spacer is not provided with a projection similar to the lug 171 of the spacer 168$^a$.

The spacer 168$d$ is located immediately after the fourth side of the box blank and is provided with a lug 175 similar in position to lugs 172 and 174. The lug 175 is substantially thicker than the lugs 172 and 174 so that it causes a deflection of the cam plate 91 sufficient to cause the same to be locked by cooperation between the finger 115 and the latch projection 114 of the vertical lever 112. It will be understood that the projections 172, 173, and 174 are of insufficient thickness to effect locking of the cam plate 91 so that the stitching mechanism resumes operation immediately after these lugs become disengaged from the cam members 118, 119, 120 and 121, whereas after the disengagement of the lugs 175 from the cam members 118 and 119, the stitching mechanism remains inoperative until the lever arm 109 is deflected by a projection 171 on a spacer 168$a$ associated with the following box blank.

A vertical abutment plate 176 is mounted near the cam plate 91 and beneath the chain 25, for the purpose of receiving the thrust experienced by the dependent portions of the spacers 168$a$, 168$b$, 168$c$ and 168$d$ when they are in contact with the cam members carried by said cam plate.

It will be understood that the lugs 171, 172, 173, 174 and 175 are located with respect to the stapling mechanism and with the lines of junction between adjacent sides of the box blank, so that stapling is suspended when said lines of division are passing underneath said stapling mechanism. While the lugs are located in close proximity to said lines of division, and the cam plate 91 is located close to the stapling mechanism it will be understood that this is not necessary since it is obvious that they may be located at a distance therefrom and adapted to exercise the same control.

Further it is obviously not necessary that these lugs shall be mounted upon or associated with the spacers 168, provided that the relationship between the suspension of the stapling mechanism and the lines of junction between the adjacent sides, is maintained.

While passing beneath the stapling mechanism the box elements are engaged by presser shoes 177, which are located intermediate of the chains 25 and are adjustably mounted upon a cross bar 178 supported between the castings 30. On the rear side of the stitching mechanism and between the chains 25 are mounted rails 179 which are adapted to receive the stitched box blanks, remove them from the chains 25 and deliver them at a point behind the rear sprocket wheels 27.

It will be readily understood that since the stapling mechanism and the chains 25 are operated from the motor 37 that the spacing between the staples can be adjusted by setting of the gear box 46. Actually I have employed a gear box which permits of adjustability of the space between staples from 1½ inches up to 2 inches by thirty-seconds of an inch.

Another variable factor which controls the location of the staples on the box blank, resides in the replacability or adjustability of the cam members 118, 119, 120 and 121. As will be fully understood from the previous description these cam members cooperate with the lugs on the spacers 168a, 168b, 168c, and 168d so as to control the termination and the commencement of the stapling mechanism operation.

In starting the machine the spacers 168 are applied to the chains 25, as shown in Fig. 19 so as to receive therebetween cleats 164 and 165 of the size necessary for the box which is to be made. The gear box 46 and the cam members 118, 119, 120 and 121 are adjusted so as to give the desired location to the staples which are to be driven into the box sides. Staple forming wire is supplied to the stapling devices as described above and binding wire is supplied to each of said stapling devices, which wire is guided thereby in such a manner that the staples formed are driven astride said wire which is thereby held upon the box blank. In the drawings the binding wire is indicated by numeral 180 and staples by the numeral 181. (See Fig. 22.)

In describing the operation of the machine it is assumed that the cam plate 91 is in locked position so that the rocking shaft 76 is held by the toothed segment 106, the crosshead 58 is in its uppermost position, the clutch is disengaged, the projection 127 is held by the buffer 124 and the brake band 138 is in applied position.

The chains 25 are being moved by the operation of the motor. The operator or operators place the cleats 164 and 165 in the position described above on the chains 25, the inner portion 169 of the spacers 168 serving as abutments therefor. Then operator or operators apply thereover sheets of veneer 182 so as to constitute the sides of the box. The outer flanges 162 of the chains and the upstanding ribs 170 of the spacers 168 constitute abutments which facilitate placing of the sheets of veneer. The inner flanges 163 of the chains 25 and the main portion of the spacers 168 are located below the upper faces of the cleats so that the veneer rests directly on the upper faces of said cleats. As the chains carry the assembled blank toward the stapling mechanism, the presser shoes 177 engage the upper surface of the sheets of veneer 182 and hold some in position until the stapling is effected.

As the work proceeds toward the stapling mechanism, the lug 171 of the spacer 168a engages the arm 109 of the bell crank lever 107 and causes same to rotate so that the arm 110 moves the vertical lever 112 rearwardly so as to allow the finger 115 of the cam plate 91 to become disengaged from the latch projection 114 of the vertical lever 112. Thereupon the cam plate 91 assumes a more vertical position under the action of the spring 100 which bears upon the lever 90. This movement brings the cam members 118 and 119 into contact with the lug 172, also carried by the spacer 168a, so that the rod 92 remains in the recess 104 of the wheel 101 until the projection 172 moves past the cam member 119.

When the cam member 119 becomes disengaged by the lug 172 the cam plate 91 assumes a vertical position and the lever 90 a horizontal position so that the rod 92 is withdrawn from the recess 104 in the wheel 101 so that the rocking shaft 76 is released. Thereupon the spring 84 acting upon the lever 83 causes the rocking shaft 76 to rotate in the counter-clockwise direction as viewed in Figs 2, 4, 5 and 7. As a result of this rotation the projection 146 of the lever 142 is raised out of contact with the projection 150 so that the brake band 138 is released. At the same time the buffer 124 is retracted out of contact with the projection 127 of the nut 126 whereupon the spring 136 causes the nut 126 to feed along the screw threads 129 of the sleeve 128 so that the flanges 130 and 132 tightly engage the friction plates 133 between them thereby causing the stitching mechanism to be operated from the main shaft 40 by means of the pitmen 60 which cause the upward and downward reciprocation of the crosshead 58. Consequently it is clear that the location of the first row of staples is determined by the disengagement of the lugs 172 from the cam member 119 and that this location can be adjusted by adjusting said cam member.

As the staples are being driven the cheeks 52 are caused to move in the same direction as the chains 25 and at substantially the same speed so that the staples are not deformed or dragged by reason of relative motion between the stapling devices and the work in which same are being driven. This movement is caused by the eccentrics 75, acting through eccentric straps 74, pitmen 73, pivoted lever 72 and link 71.

The stapling operation continues uninterruptedly with the passage of the work underneath the stapling mechanism until the cam plate 91 is again displaced by the lug 173 on the spacer 168b at the forward edge of the second side of the box. Thus it is apparent that the spacing of the rows of staples is dependent upon the initial adjustment of the gear box 46.

During the stitching operation the shaft 76 is caused to rock or oscillate by the action of the eccentric 82, pitman 80 and arm 77. This rocking causes the buffer 124 to oscillate in and out of the path of the projection 127 on the nut 126, said rocking or oscillation being so timed that the buffer 124 is retracted out of the path of the projection 127 during the period of the stitching operation. The rocking movement of the shaft 76 causes the projection 146 of the lever 142, to oscillate upwardly and downwardly across the path of oscillation of the projection 150 of the pivoted link 148. As explained above said link is oscillated backwardly and forwardly by the eccentric 154 and said oscillation is timed with respect to the rocking of the rocking shaft 76 so that during the continuance of the stapling operation the projections 146 and 150 do not collide.

When the projection 173 of the spacer 168b at the forward edge of the second side of the box comes into contact with the lower cam member 120, the cam plate 91 is deflected thereby and remains deflected until said lugs become disengaged from the cam member 121. This deflection is insufficient to cause interlocking between the finger 115 and the vertical lever 112 so that the cam plate 91 assumes its vertical position immediately after said disengagement. When the cam plate 91 is thus deflected the lever 90 moves downwardly against the compression of the spring 100 and compresses the spring 99 thus causing the rod 92 to bear upon the periphery of the wheel 101.

When the rocking shaft 76 rotates to its full extent in the clockwise direction as viewed in Fig. 4, the recess 104 of the wheel 101 attains a position below the rod 92, which under the action of the spring 99, is forced thereinto so that the wheel 101 and consequently the rocking shaft 76 is held immovable until the lug 173 becomes disengaged from the cam member 121, whereupon the rod 92, cam plate 91 and associated parts assume their initial position.

The counter-clockwise rotation of the shaft 76 being thus prevented the buffer 124 is not withdrawn out of the path of the projection 127 so that said projection is held and the nut 126 is withdrawn along the screw threads 129 so that the friction discs 130 and 132 are no longer held together in driving relation. Simultaneously with the release of the clutch or immediately thereafter the projections 146 and 150 come into contact and the arm 142 is moved forwardly, thus tightening the brake band 138 upon the drum 137, thereby bringing the shaft 40 to a stop. As indicated above the parts are so arranged that this stoppage occurs when the crosshead 58 is in its uppermost position.

When the lug 173 moves past the cam member 121 the cam plate 91 assumes its vertical position and the lever 90 a horizontal position and the rod 92 is withdrawn from the recess 104 of the wheel 101 so that the rocking shaft 76 is released. The spring 84 acting on the lever 83 causes the counterclockwise rotation of the rocking shaft 76, as viewed in Fig. 4. The buffer 124 is thereby withdrawn out of contact with the projection 127 and the clutch is engaged by the action of the spring 136 so that the shaft 40 becomes driven from the pulley 38.

This movement of the shaft 76 under the action of the spring 84 causes the roller 145 on the arm 144 to raise the lever 142, thereby bringing the projection 146 out of contact with the projection 150 so that the brakeband 138 is released. As will be readily understood when the shaft 40 resumes rotation the operation of the stapling mechanism also resumes.

The stapling of the second side of the box continues uninterruptedly until the lug 174 of the spacer 178c at the forward edge of the third side of the box comes into contact with the cam member 118, whereupon the deflection of the cam plate 91 and the stitching operation is suspended until the line of junction between the second and third sides of the box has passed beneath the stapling mechanisms. The stapling of the third side of the box continues until the lug 73 of the spacer 168b at the forward edge of the fourth side of the box comes into contact with the cam member 120, whereupon the stapling operation is again temporarily suspended so as to avoid driving staples into the junction between the third and fourth sides of the box. After said line of junction has passed beneath the stapling mechanism the stapling operation is resumed until the lug 175 of the spacer 168d comes into contact with the cam member 118 and causes deflection thereof. The lug 175 is similarly located on the spacer 168d to the lugs 172 and 174 on the spacers 168a and 168c respectively, but the lug 175 is substantially thicker than said lugs so that it deflects the cam plate 91 to such a degree that the finger 115 thereon engages beneath the latch projection 114 on the vertical lever 112 so that the rocking shaft 76 and associated parts are held immovable until the lug 171 on the spacer 168a at the forward edge of the next blank, makes contact with the arm 109 of the bell crank lever 107 and thereby releases said finger 115 from the latch projection 114.

It will thus be understood that the lugs 172, 173, 174 and 175 cooperate alternately with the cam members 118, 119 and 120, 121. This enables the location of the staples on the first and third sides of the box and the location of the staples of the second and fourth sides of the box to be controlled independently of each other so that in conjunction with the control of the space between consecutive staples by means of the gear box 46, satisfactory location of the staples may be automatically insured for box blanks having sides of various depths. It will be readily understood that the configuration or the adjustment of the cam member 119 controls the release of the stapling mechanism and the location of the first staples driven into the first and third sides of the box blank, while the configuration or adjustment of the cam member 121 controls the release of the stapling mechanism and the location of the first staples driven into the second and fourth sides of the box blank.

The configuration or adjustment of the cam member 118 controls the points of arrestment of the rocking shaft 76 and the stoppage of the stapling mechanism which results therefrom, after the stapling of the second and fourth sides of the box blank is completed, while the configuration or adjustment of the cam member 120 exercises a similar controlling function after the first and third sides of the box blank have been stapled. It will thus be understood that the same control is applied to the first and third sides of the box blank, the sides being of equal width, while a different control is applied to the second and fourth sides of the box blank which are of the same width but which is generally different from the width of the first and third sides. It will be readily understood that by adjustment of the gear box 46, in conjunction with adjustment of the cam members 118, 119, 120 and 121 the location of the first staple applied to a side of the box blank, the spacing of the staples and the location of the last staple on each side of the box can be predetermined so that the staples are symmetrically arranged on each side of the box blank and the binding wires are effectively secured thereto.

After the box blank passes under the stapling mechanisms it is progressively carried by the chains 25 over the rails 179 on which it is retained when the chains pass downwardly around the sprocket wheels 27. The consecutive box blanks, as they pass from the machine are connected by the binding wires 180. These wires are severed in any suitable manner so as to separate the box blanks. In fabricating said blanks into boxes the sides are turned into rectangular relation about their lines of junction. This turning causes the tongues 166 to enter into the grooves 167 as shown in Fig. 22. The box sides may be secured in any suitable manner and suitable ends applied thereto.

I claim:

1. In a machine for making wire bound box blanks, the combination of stapling mechanism, a work conveyor adapted to carry the work past said stapling mechanism, means adapted to unlock the stapling mechanism when a box blank is presented thereto, means to interrupt the stapling mechanism when the lines of junction between box sides are passing thereby, and means for locking the stapling mechanism when each box blank is stapled.

2. In a machine for making wire bound box blanks, the combination of a carrier for the work, stapling mechanism, drive means for said stapling mechanism, said stapling mechanism being operatively connected to said carrier so as to drive successive rows of staples into the work at uniform space intervals, means for controlling the starting and arresting of the stapling mechanism when working on the first and third box sides, and separate means for controlling the starting and arresting of the stapling mechanism when working on the second and fourth box sides.

3. In a machine for making wire bound box blanks, the combination of a carrier for the work, stapling mechanism, drive means for said stapling mechanism, said stapling mechanism being operatively connected to said carrier so as to drive successive rows of staples into the work at uniform space intervals, regulable means for controlling the starting and arresting of the stapling mechanism when working on the first and third box sides, and separate regulable means for controlling the starting and arresting of the stapling mechanism when working on the second and fourth box sides.

4. In a machine for making wire bound box blanks, the combination of a carrier for the work, stapling mechanism operatively connected thereto so as to drive rows of staples into the work at uniform space intervals, means for unlocking the stapling mechanism when each blank is presented thereto, means for controlling the starting and arresting of the stapling mechanism when working on the first and third box sides, and separate means for controlling the starting and arresting of the stapling mechanism when working on the second and fourth box sides.

5. In a machine for making wire bound box blanks, the combination of a carrier for the work, stapling mechanism operatively connected thereto so as to drive rows of staples into the work at uniform space intervals, means for unlocking the stapling mechanism when each blank is presented thereto, regulable means for controlling the starting and arresting of the stapling mechanism when working on the first and third box sides, and separate regulable means for controlling the starting and arresting of the stapling mechanism when working on the second and fourth box sides.

6. In a machine for making wire bound box blanks, the combination of stapling mechanism, a work carrier operatively connected thereto so that the stapling mechanism is adapted to drive successive rows of staples into the work at uniform space intervals, means for unlocking the stapling mechanism when a box blank is presented thereto, means for engaging the drive of the stapling mechanism so as to drive the first row of staples into a box side at predetermined location; means for disengaging the drive of the stapling mechanism after the stapling of each box side, the last of said means being adapted to lock the stapling mechanism, and means for arresting the stapling mechanism at a predetermined position thereof after said disengagement.

7. In a machine for making wire bound box blanks, the combination of a shaft for driving stapling mechanism, a clutch through which said shaft is driven, a brake for said shaft, a rocking shaft, means on the driving shaft for oscillating said rocking shaft, a buffer member adapted to be moved into and out of the path of a declutching projection on said clutch, a brake applying member adapted to be reciprocated by said driving shaft and means connected to said brake and adapted to be oscillated into and out of the path of the brake applying member by the rocking shaft, and means for holding said rocking shaft in such position that said buffer member effects declutching of the clutch and the brake is applied by the brake applying member.

8. In a machine for making wire bound box blanks, the combination of a shaft for driving stapling mechanism, a clutch through which said shaft is driven, a brake for said shaft, a rocking shaft, means on the driving shaft for oscillating said rocking shaft, a buffer member adapted to be moved into and out of the path of a declutching projection on said clutch, a brake applying member adapted to be reciprocated by an eccentric on said driving shaft, a lever connected to said brake and adapted to be oscillated into and out of the path of the brake applying member by the rocking shaft, means for holding said rocking shaft so that the buffer member effects declutching of the clutch and the brake applying member applies the brake to arrest the stapling mechanism at a predetermined position dependent upon the position of the eccentric on said driving shaft.

9. In a machine for making wire bound box blanks, the combination of a driving shaft for stapling mechanism, a rocking shaft resiliently driven from said driving shaft, a clutch for said driving shaft, a brake for said driving shaft, means associated with said driving shaft and rocking shaft for temporarily disengaging the clutch and applying the brake when the rocking shaft is held, and means moving in unison with the work to hold said rocking shaft still at and for predetermined times.

10. In a machine for making wire bound box blanks, the combination of a work carrier, stapling mechanism, a driving shaft therefor, a rocking shaft, means associated with said driving and rocking shafts to arrest the driving shaft when the rocking shaft is held, means mounted on said carrier adapted to operate mechanism to hold said shaft so as to suspend stapling upon predetermined portions of the work.

11. In a machine for making wire bound box blanks, the combination of a cam plate, means moving with the work adapted to deflect said plate, a rod resiliently connected to said plate, and an oscillating member adapted to engage with said rod, said oscillating member being recessed to receive said rod and be thereby held against oscillation when the plate is deflected.

12. In a machine for making wire bound box blanks, the combination of a work carrier, stapling mechanism, drive means for said stapling mechanism, operative mechanism connecting said carrier and mechanism and causing operation thereof at predetermined relative speeds, spacers on said carrier to aid the assembly of box blanks thereon, projections on said spacers, and a cam member having cam elements adapted to cooperate with said projections so as to start and arrest said stapling mechanism for driving said staples at predetermined locations on each box side.

13. In a machine for making wire bound box blanks, the combination of a work carrier, stapling mechanism, operative mechanism connecting said carrier and mechanism and causing operation thereof at predetermined relative speeds, two sets of cam members adapted to control the starting and stopping of the stapling mechanism, spacers on said carrier to aid the assembly of box blanks thereon, projections on said spacers arranged alternately to contact with one or the other sets of cam members.

14. In a machine for making wire bound box blanks, the combination of a work carrier, stapling mechanism, operative mechanism connecting said carrier and mechanism and causing operation thereof at predetermined relative speeds, a cam plate, two sets of cam members mounted thereon, said cam plate being adapted to control the starting and stopping of the stapling mechanism, latch means adapted to hold said plate in deflected position, spacers on said carrier to aid the assembly of box blanks thereon, projections on said spacers arranged alternately to engage one or the other of the cam members, the last projection being adapted to deflect the cam plate so that it becomes latched, and an additional projection carried by the first spacer to unlatch said cam plate.

15. In a machine for making wire bound box blanks, the combination of a work carrier, stapling mechanism, a cam plate adapted to be deflected to start and arrest the stapling mechanism, a latch adapted to maintain said cam plate in deflected position, a pivoted lever engaging said latch, means mounted on said carrier in definite relation to the work carrier thereby to operate said lever and disengage said latch, means mounted on said carrier in definite relation to the work thereon and adapted to cooperate with said cam plate to stop the stapling mechanism while the lines of junction of adjacent box sides are passing thereby, the last of said means being adapted to cause the plate to be deflected sufficiently to effect locking engagement between the plate and latch.

16. A machine for making wire bound box blanks, comprising stapling mechanism, chains for carrying assembled box blanks in operative relation thereto, a source of power, means comprising a selective gear shift for driving the chains therefrom, means comprising a driving shaft and a clutch for driving the stapling means therefrom, a rocking shaft adapted to be rocked by said driving shaft, buffer means adapted to be rocked by said rocking shaft into and out of the path of a declutching projection on said clutch, a brake on said driving shaft, a lever attached to said brake and adapted to be oscillated by said rocking shaft across the path of reciprocation of a member actuated by an eccentric on said driving shaft in such a manner that when the rocking shaft is held against rocking and in predetermined position the clutch is disengaged and the brake applied at a predetermined position of the stapling means dependent upon the position of said eccentric on the driving shaft, a wheel positively driven from said rocking shaft so that it oscillates therewith, said wheel being recessed, a cam plate carrying two sets of adjustable cams, a latch adapted to maintain said plate in deflected position, a bell crank lever having one arm held against said latch, the other arm being adapted to approach one of said chains, a rod resiliently operated by said cam plate and adapted to engage the periphery of said wheel and enter said recess to hold the rocking shaft, a series of spacers on said chains to aid in the assembly of box blanks thereon, projections on the spacers on one chain adapted alternately to engage the sets of cams on the cam plate, the projection on the last of said spacers being sufficiently thick to effect locking of the cam plate in deflected position and an additional projection on the first spacer to contact with the arm of the bell crank lever and release the cam plate latch.

17. In a machine for making wire bound box blanks, stapling mechanism, conveying means for moving the assembled sections of box blanks beneath the stapling mechanism, means for interrupting the stapling operation between sections, and means for locking the stapling mechanism against operation between blanks.

18. In a wire bound box blank making machine, stapling mechanism, a conveyor for moving box blanks beneath said stapling mechanism, means for locking the stapling mechanism against movement as the rear end of the blank passes by, and means for unlocking the stapling mechanism to again permit stapling as the forward end of the succeeding blanks passes under the stapling mechanism.

19. In a wire bound box blank making machine, a stapler, a conveyor for carrying assembled sections of the box blank beneath the stapler, means for temporarily holding the stapler against operation during the passage of a joint thereunder but releasing the same after passage of the joint, means to lock the stapler against operation upon passage of the rear end of the blank, and means to unlock the stapler upon passage of the forward end of the next succeeding blank.

20. In a machine for making wire bound box blanks provided with a stapling mechanism and work carrier, a stapling control device comprising a rockable cam having a series of cam elements, means movable with said carrier and contacting certain of said elements at intervals for rocking said cam and interrupting said stapling mechanism, and means for holding said cam out of the path of travel of said means whereby said mechanism is locked at the completion of a blank.

21. In a machine for making wire bound box blanks provided with a stapling mechanism and work carrier, a shaft for said mechanism, a clutch for engaging and disengaging said shaft with a drive element, an auxiliary shaft rocked by said stapling shaft, means operated by projections associated with said carrier for holding and releasing said rock shaft, and resilient means for initiating movement of said rock shaft to effect engagement of said clutch when said rock shaft is released.

22. In a machine for making wire bound box blanks provided with a stapling mechanism and work carrier, a stapling shaft carrying a clutch for connecting the same to a drive element, a rock shaft rocked by said stapling shaft, means operated by said carrier for holding and releasing said rock shaft, means for operating said clutch, said means including an arm, and a resilient means operatively connected to said shaft for rocking the same to operate said clutch when said rock shaft is released.

23. In a machine for making wire bound box blanks provided with a stapling mechanism and work carrier, a rock shaft adapted to be held and released for controlling the operation of said mechanism, a notched wheel associated with said rock shaft and rotated thereby, a cam having a series of cam elements, said cam being provided with an arm, a pin carried by said arm and adapted to be received by said notch for holding and releasing said wheel and rock shaft, and means associated with said carrier and adapted to contact with said elements for movement of said pin into and out of engagement with said notch.

24. In a machine for making wire bound box blanks provided with a stapling mechanism and work carrier, a rock shaft adapted to be held and released for controlling the operation of said mechanism, a cam having cam elements, said cam provided with an arm, a wheel provided with a notch adapted to be moved by said rock shaft, and a pin resiliently connected with said arm and moved thereby into or out of said notch for holding or releasing said rock shaft.

25. In a machine for making wire bound box blanks provided with a stapling mechanism and work carrier, a rock shaft adapted to be held and released for controlling the operation of said mechanism, a cam block, a cam rockably carried by said block and provided with an arm, a pin carried in said block and adapted to be moved by said arm, a notched wheel carried by said block and moved by said rock shaft, and means associated with said carrier for movement of said cam to move said pin into and out of engagement with said notch for holding and releasing said rock shaft.

26. In a machine for making wire bound box blanks provided with a stapling mechanism and a work carrier, a stapling control mechanism comprising means for locking said mechanism upon completion of stapling of a blank, and means for unlocking said mechanism when a succeeding blank is presented thereto.

27. In a machine for making wire bound box blanks provided with a stapling mechanism and a work carrier, a rockable cam movable by lugs associated with said carrier for controlling said stapling mechanism, and a latch device operated by lugs associated with said carrier for locking and unlocking said cam for disengagement and engagement of said cam and said first mentioned lugs.

28. In a machine for making wire bound box blanks provided with a stapling mechanism and a work carrier having projecting lugs associated therewith, a rockable cam for controlling said stapling mechanism and operated by said lugs, said cam provided with an arm, a latch member adapted to engage said arm for holding said cam out of engagement with said lugs, and an arm moved by said lugs for unlocking said latch.

29. In a machine for making wire bound box blanks provided with a stapling drive shaft, a clutch carried thereby and provided with a projection, a rock shaft held and released by mechanism controlled by the work passing through said machine, means operatively connected with said rock shaft for engaging with said projection, and a lever resiliently held adapted to disengage said means and projection for clutching said shaft, with a drive element when said rock shaft is released.

30. In a machine for making wire bound box blanks provided with a stapling drive shaft, a clutch carried thereby and provided with a projection, a rock shaft held and released by mechanism associated with the work passing through the machine, linkage movable by said rock shaft and engaging said projection to disengage said stapling shaft from a drive element, an arm mounted on said rock shaft, and resilient means connected with said arm for rocking said rock shaft when the same is released for disengaging said linkage from said projection for clutching said shaft and drive element.

31. In a machine for making wire bound box blanks, a stapling mechanism, a work carrier for conveying box blanks to said mechanism, a rock shaft for controlling operation of said mechanism, means controlled by said carrier for holding and releasing said rock shaft during predetermined portions of the work for suspending and resuming operation of said stapling mechanism, means for locking said rock shaft holding and releasing means upon passage of the rear end of a blank, and means for unlocking said rock shaft holding and releasing means upon passage of the forward end of the next succeeding blank.

32. In a machine for making wire bound box blanks, a stapling mechanism, a work carrier for conveying box blanks to said mechanism, a rock shaft for controlling the operation of said mechanism, means controlled by said carrier for holding said rock shaft to arrest said mechanism during predetermined portions of the work, means for locking said holding means to arrest said mechanism upon passage of the rear end of a blank, and means for unlocking said holding means upon passage of the forward end of the next succeeding blank to again permit operation of said mechanism.

33. In a machine for making wire bound box blanks, a stapling mechanism, a driving shaft therefor, a work carrier for conveying box blanks to said mechanism, a rock shaft for controlling the operation of said drive shaft, means for arresting the drive shaft when said rock shaft is held, means controlled by said carrier for holding said rock shaft so as to suspend stapling upon predetermined portions of the work, and means for locking said rock shaft holding means between blanks.

34. In a machine for making wire bound box blanks, a stapling mechanism, a driving shaft therefor, a work carrier for conveying box blanks to said mechanism, a rock shaft for controlling the operation of said drive shaft, means for arresting the drive shaft when said rock shaft is held, means for holding and releasing said rock shaft, means mounted on said carrier for operating said last mentioned means for holding said rock shaft so as to suspend stapling upon predetermined portions of the work, and means for locking said rock shaft holding and releasing means between blanks.

35. In a machine for making wire bound box blanks, a stapling mechanism, a driving shaft therefor, a work carrier for conveying box blanks to said mechanism, a rock shaft for controlling the operation of said drive shaft, means for arresting the drive shaft when said rock shaft is held, means controlled by said carrier for temporarily holding said rock shaft to interrupt operation of the stapling shaft during certain portions of the work, means for locking said rock shaft holding means whereby said stapling shaft is rendered inoperative during passage of the rear end of a blank, and means for unlocking said holding means upon passage of a forward end of the next succeeding blank to again permit operation of said mechanism.

36. In a machine for making wire bound box blanks provided with a stapling mechanism and work carrier, a shaft for said mechanism, a clutch for engaging and disengaging said shaft with a drive element, a brake for arresting movement of said shaft when said clutch is disengaged, an auxiliary shaft rocked by said stapling shaft, means for holding and releasing said auxiliary shaft, means mounted on said carrier for operating said last mentioned means to hold said shaft to disengage said clutch and apply said brake during predetermined portions of the work, and means for initiating movement of said auxiliary shaft to effect an engagement of said clutch and release of said brake when said auxiliary shaft is released.

37. In a machine for making wire bound box blanks provided with a stapling mechanism and work carrier, a stapling shaft carrying a clutch for connecting the same to a drive element, a rock shaft rocked by said stapling shaft, means for holding and releasing said rock shaft so as to arrest the drive shaft when the rock shaft is held, means mounted on said carrier adapted to operate said last mentioned means to hold said rock shaft, and means for operating said clutch, said means including an arm and a resilient means operatively connected to said shaft for rocking the same to operate said clutch when said rock shaft is released.

38. In a machine for making wire bound box blanks provided with a stapling mechanism and work carrier, a stapling control device comprising a rockable cam, means movable with said carrier and contacting said cam at intervals for rocking the same and interrupting said stapling mechanism, and means for holding said cam out of the path of travel of said last mentioned means whereby said mechanism is locked at the completion of a blank.

39. In a machine for making wire bound box blanks provided with a stapling mechanism and work carrier, a stapling control device comprising a rockable cam, means movable with said carrier and contacting said cam at intervals for rocking the same and interrupting said stapling mechanism, means for holding said cam out of the path of travel of said last mentioned means, means movable with said carrier for causing said cam to engage with said holding means at the completion of a blank, and means movable with said conveyor for releasing said cam at the beginning of a blank.

In witness whereof, I hereunto subscribe my name to this specification.

WALTER FRANK VAN DE VENTER.